United States Patent
Prey

(10) Patent No.: US 9,909,617 B1
(45) Date of Patent: Mar. 6, 2018

(54) HINGE

(71) Applicant: Dowco, Inc., Manitowoc, WI (US)

(72) Inventor: Bradley Prey, Green Bay, WI (US)

(73) Assignee: Dowco, Inc., Manitowoc, WI (US)

( * ) Notice: Subject to any disclaimer, the term of this patent is extended or adjusted under 35 U.S.C. 154(b) by 0 days.

(21) Appl. No.: 15/412,134

(22) Filed: Jan. 23, 2017

(51) Int. Cl.
*E05D 11/00* (2006.01)
*F16C 11/10* (2006.01)
*F16C 11/04* (2006.01)

(52) U.S. Cl.
CPC .............. *F16C 11/10* (2013.01); *F16C 11/04* (2013.01)

(58) Field of Classification Search
CPC .. E05D 11/1007; E05D 11/1014; F16C 11/10; F16C 11/04; Y10T 403/32409; Y10T 403/32393; Y10T 403/7005; Y10T 403/7007
See application file for complete search history.

(56) References Cited

U.S. PATENT DOCUMENTS

| | | | | |
|---|---|---|---|---|
| 1,039,986 A | * | 10/1912 | Merritt | 403/61 |
| 1,541,674 A | * | 6/1925 | Wever | A63B 53/00 403/102 |
| 2,818,291 A | * | 12/1957 | Corns | B25G 1/04 15/144.1 |
| 2,895,757 A | * | 7/1959 | Kaspar | G05G 1/00 15/144.1 |
| 5,611,552 A | | 3/1997 | Miles et al. | |
| 5,730,449 A | | 3/1998 | Miles | |
| 5,938,223 A | | 8/1999 | Kotlier | |
| 5,941,011 A | | 8/1999 | Baker | |
| 6,018,846 A | * | 2/2000 | Huang | A47D 13/063 16/327 |
| 6,082,753 A | | 7/2000 | Kotlier | |
| 6,353,969 B1 | * | 3/2002 | LeMole | B60J 7/1204 114/361 |
| 6,354,758 B1 | | 3/2002 | Chaulk | |
| 6,533,489 B1 | | 3/2003 | Zheng | |
| 6,565,069 B2 | * | 5/2003 | Morris | E04F 11/1836 256/65.15 |
| 6,711,783 B2 | * | 3/2004 | LeMole | B60J 7/1204 114/361 |
| 7,481,438 B2 | | 1/2009 | Hernandez | |
| 7,634,969 B2 | | 12/2009 | Neunzert et al. | |
| 7,735,431 B2 | | 6/2010 | Neunzert | |
| 8,006,345 B1 | | 8/2011 | Bryce | |
| 8,425,345 B2 | * | 4/2013 | Wall, Jr. | A63B 53/10 403/349 |

(Continued)

FOREIGN PATENT DOCUMENTS

EP  2727494  5/2014

OTHER PUBLICATIONS

Hinge; Dowco, Inc.; prior art for purposes of prosecution.

*Primary Examiner* — Victor D Batson
*Assistant Examiner* — Matthew J Sullivan
(74) *Attorney, Agent, or Firm* — Shane Delsman; Godfrey & Kahn, S.C.

(57) ABSTRACT

A hinge can be used between two structures to allow the structures to be quickly and easily folded and unfolded. The hinge has a first body connected to a structure and a second body connected to a structure. The first and second bodies are also connected to one another by a sliding member that allows the hinge to be extended and folded.

17 Claims, 14 Drawing Sheets

(56) References Cited

U.S. PATENT DOCUMENTS

| | | | |
|---|---|---|---|
| 2009/0245924 A1* | 10/2009 | Whitling ................ | F16B 7/042 403/13 |
| 2011/0272923 A1 | 11/2011 | Chen | |
| 2016/0356067 A1 | 12/2016 | James | |

* cited by examiner

HINGE

FIELD OF THE INVENTION

The present invention relates generally to the field of hinges. More particularly, the present invention relates to hinges in/on structures such tubes, pipes, bars, etc.

BACKGROUND

The use of collapsible structures is desired in a number of industries. One use of collapsible structures that can be found in many industries is for protection from the elements or weather, such as the sun, wind or rain. For example, in the marine industry, watercraft users utilize structures sometimes called bimini tops to protect the occupants of the watercraft from exposure to the elements. Other examples include tents and canopies.

As with most weather related accessories, the ability to employ the structure in undesirable weather and collapse and store the structure in desirable weather is advantageous. In the marine industry, the ability to easily deploy, properly tension the fabric and stow a structure, such as a bimini, is additionally advantageous for variety of other reasons such as when going under a low bridge, when in a boat lift, when adding a boat cover, etc. Therefore, there is a need for a structure that can be moved between a deployed position and stowed position quickly and easily.

In the marine industry, some current biminis use a series of 'U' shaped structural members. These biminis can be difficult and/or inconvenient to stow on a marine vehicle or, when removed from the marine vehicle, in storage because they can be large, heavy and/or have an awkward shape. Some such biminis use tubing and hardware such as pull pins, sliding sleeves, inserts, screws or freely articulating hinges. Such hardware is not ideal. Pull pins and sliding sleeves often require the user to both hold the bimini in the desired location and secure the hardware. Pull pins can also be easily lost or require a lanyard which can get tangled. Freely articulating hinges can allow a lot of play or movement when deployed and the watercraft is in motion. These disadvantages are not only inconvenient, but can also create safety issues. Further, sometimes the optimum place for such hardware from an engineering or production perspective is a less than ideal place from a convenience or ease of use perspective. If it is desired to remove the bimini from the boat or to detach the bimini, but store it on the boat, the bimini will take up a large amount of space and could even be a tripping hazard.

Further, the boating industry includes many recreational users. Recreational users may choose not to deploy such covers or enclosures or, worse yet, deploy them contrary to the manufacturer's instructions, so as to avoid frustration and difficulty. Such use can be unsafe and/or result in damage to the cover or enclosure.

As such, there is a need for a frame with hardware that is easy and quick to engage and disengage, thereby making the frame easier and quicker to deploy and collapse.

Although the above example describes a type of a bimini top, other marine tops and accessories such as covers have similar issues as do other collapsible accessories in many different industries.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
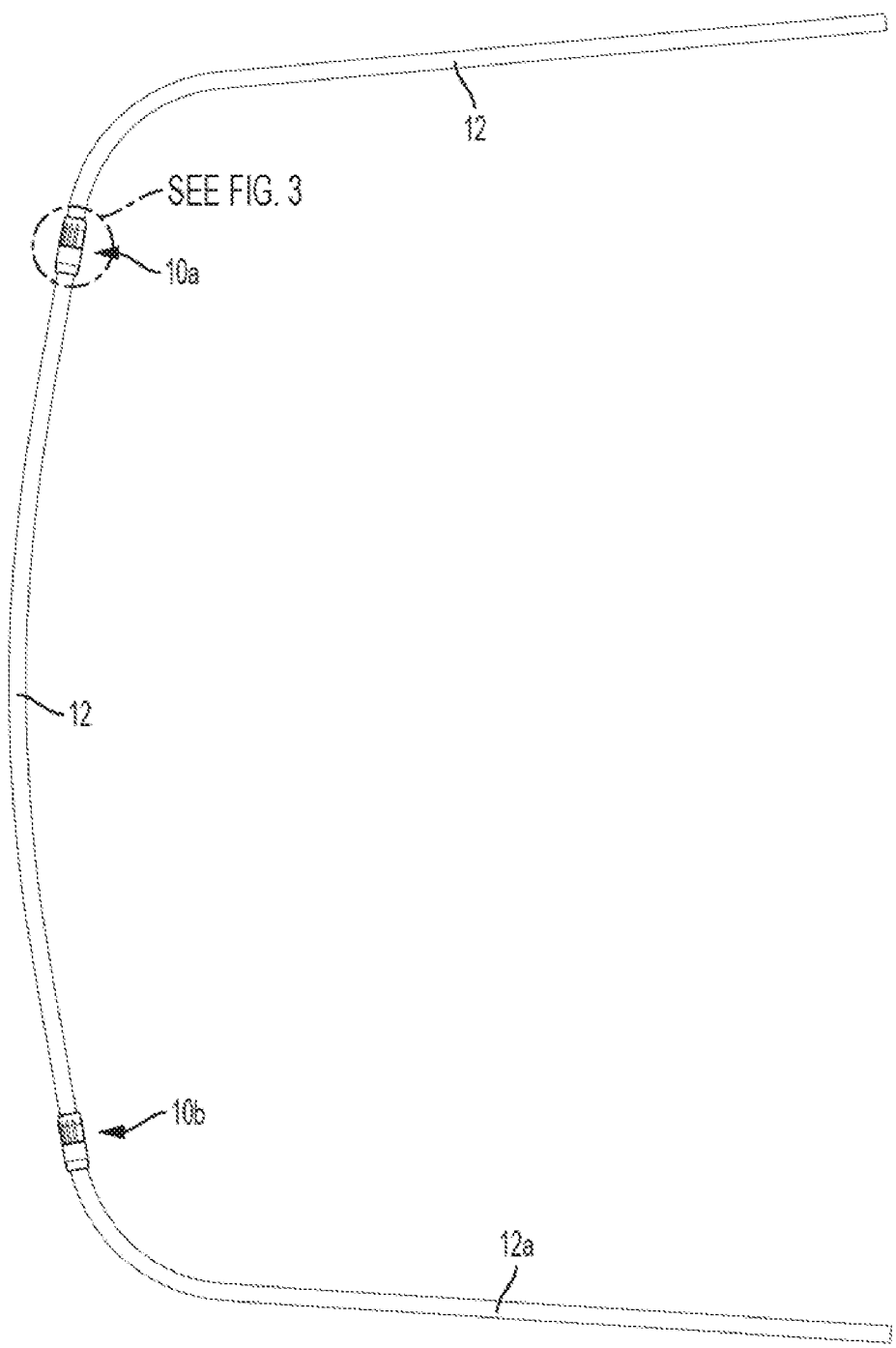
FIG. 1 is an elevation view of a 'U' shaped frame with multiple hinges in an un-collapsed position.
Figure 2:
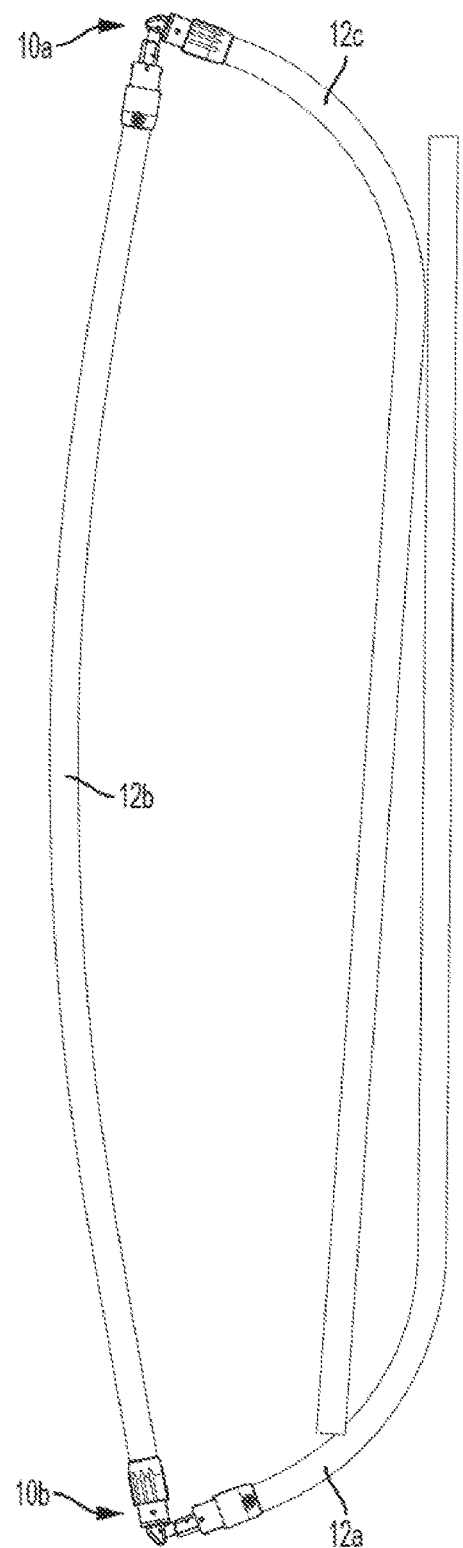
FIG. 2 is an elevation view of a 'U' shaped frame with multiple hinges in a collapsed position.
Figure 3:
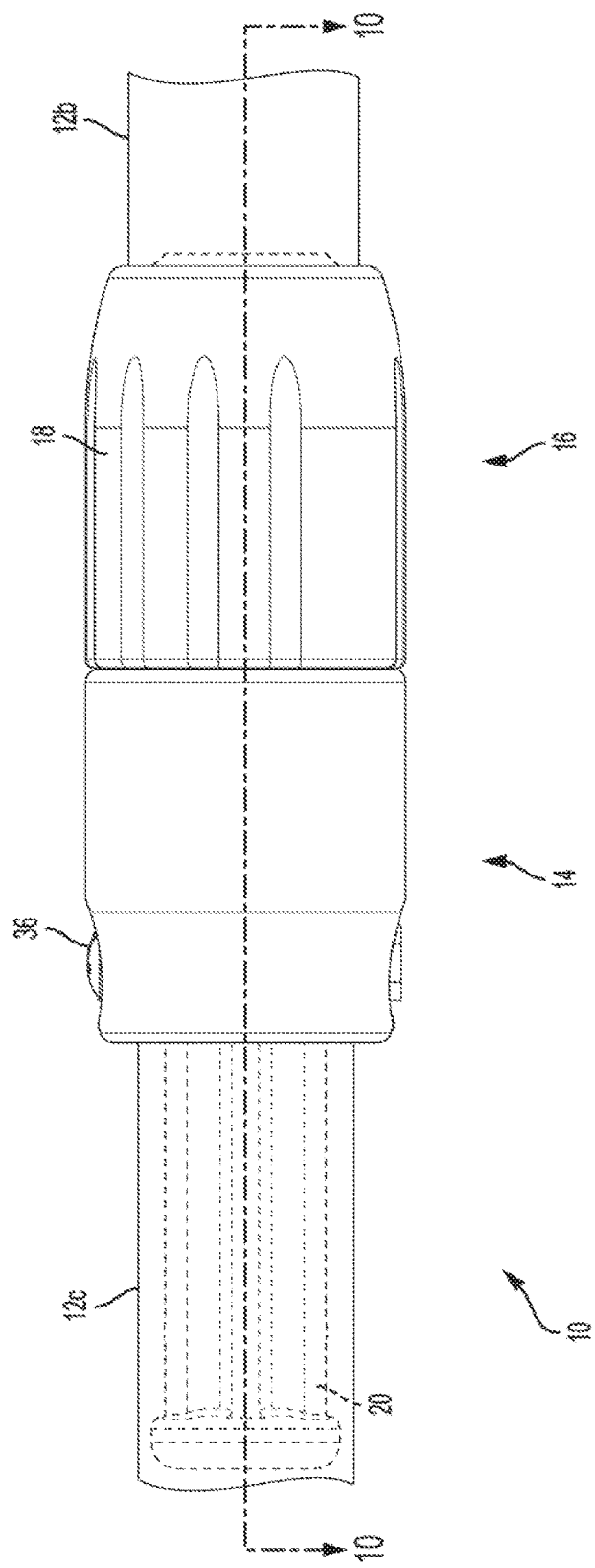
FIG. 3 is an enlarged plan view of the hinge from FIG. 1 in a locked position and attached to a structure taken from the line 3.

A hinge 10 can be used for easily and quickly deploying or collapsing an accessory, frame or structure(s) 12 as seen in FIGS. 1-2. When the hinge is locked or engaged, as can be seen in FIGS. 1 and 3, the tubular frame 12 is rigid and can withstand a variety of forces acting upon the structure. Once the hinge is unlocked, the frame can be collapsed or folded as seen in FIG. 2. Although FIG. 2 shows the frame 12 folded in half, or such that the first structure 12a of the frame is generally perpendicular to the second structure 12b of the frame, the range of motion can be set to any desired range by a number of means known in the industry for example, modifying how the hinge contacts itself when in a fully collapsed position.

The hinge 10 can pivotally connect or attach a first structure 12a to a second structure 12b. The hinge 10 has a first or base body 14 for attaching the hinge 10 to one portion of a structure 12, e.g. a first structure 12a, and a second body or sleeve body 16 for attaching the hinge to a second portion of a structure 12, e.g. a second structure 12b, as seen in FIGS. 3-7. Although the hinge is shown configured to cooperate with a hollow, circular tube, the hinge could be adapted to fit a variety of shapes and sizes, both hollow and solid.

To disengage or unlock the hinge and collapse the frame 12, a sleeve or collar 18 of the sleeve body 16 can be rotated in a first direction, for example, counterclockwise, which will unlock the sleeve body from the base body 14. With the sleeve body 16 unlocked from the base body 14, the sliding member 20 can be slid or extended out of or withdrawn from the base body as seen in FIGS. 4-5.

Figure 5:
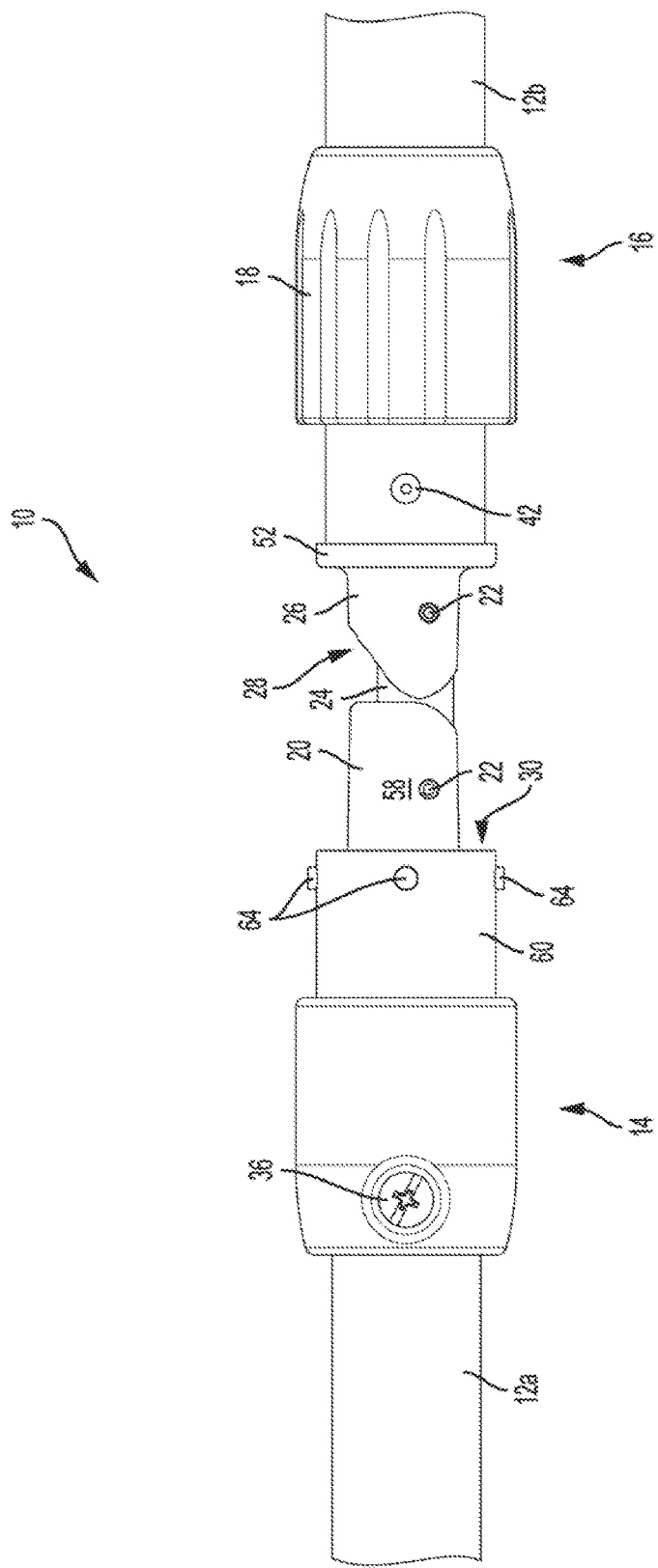
FIG. 5 is an elevation view of the hinge in FIG. 4
Figure 6:
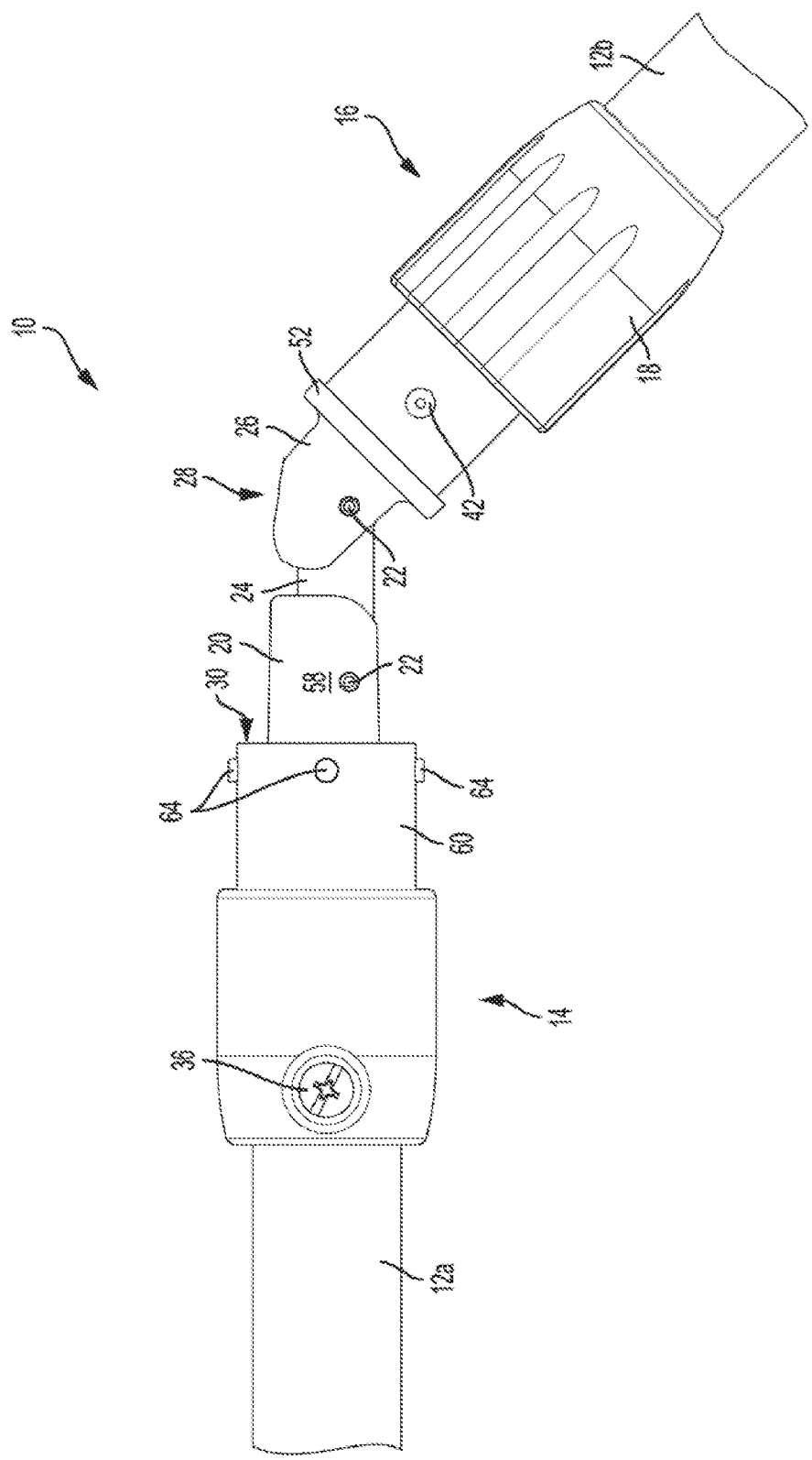
FIG. 6 is an elevation view of the hinge in FIG. 5 in an unlocked and partially rotated position.
Figure 7:
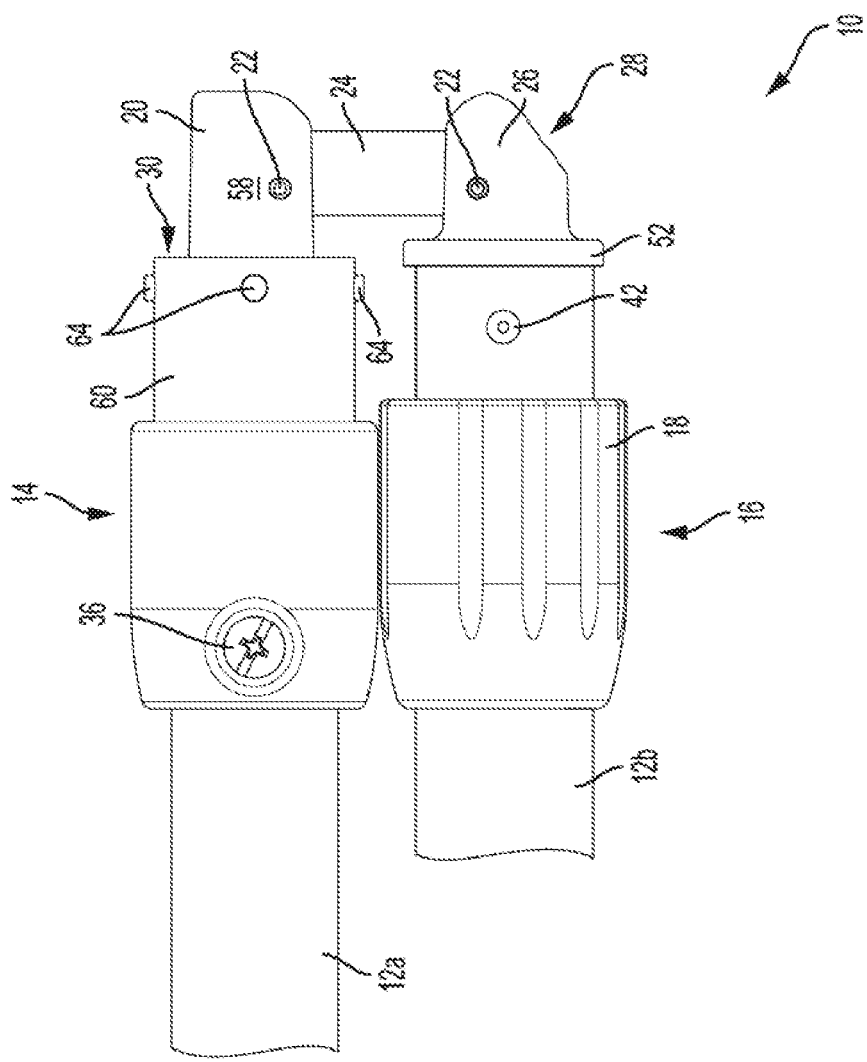
FIG. 7 is an elevation view of the hinge in FIG. 5 in an unlocked and rotated position.

In the embodiment seen in FIG. 5, the sliding member or post 20 is slidably attached to and/or slidably received by the base body 14 and is pivotally connected or rotatably attached or connected, for example by spring pins 22, to a first end of a bar or boom 24. The bar 24 is pivotally connected or rotatably attached or connected at its second end to a post portion 26 of the sleeve body 16. With the sleeve body 16 unlocked from the base body 14, a portion of the sliding member 20 can be extended out of the base body, and the base body and sleeve body, and the portion of the structure attached to the same, can be rotated as seen in FIG. 6. As seen in the embodiment illustrated in FIGS. 2 and 7, the sleeve body 16 and the base body 14 can continue to be rotated until they are generally parallel to each other. With the hinge 10 in the unlocked position, the structure, frame or accessory can be collapsed. FIGS. 2 and 7 show the hinge 10 in the collapsed position.

The post portion 26 of the sleeve body 16 can have an angled surface 28. The angled surface 28 helps prevent the post portion 26 of the sleeve body from contacting the base body 14 if the sliding member 20 is only partially withdrawn out of the opening 30. If the post portion 26 contacts the base body 14 and sufficient force is exerted on the structure 12*b* or sleeve body 16, the base body 14 could become damaged, e.g. cracked, dented, deformed, etc.

Figure 4:
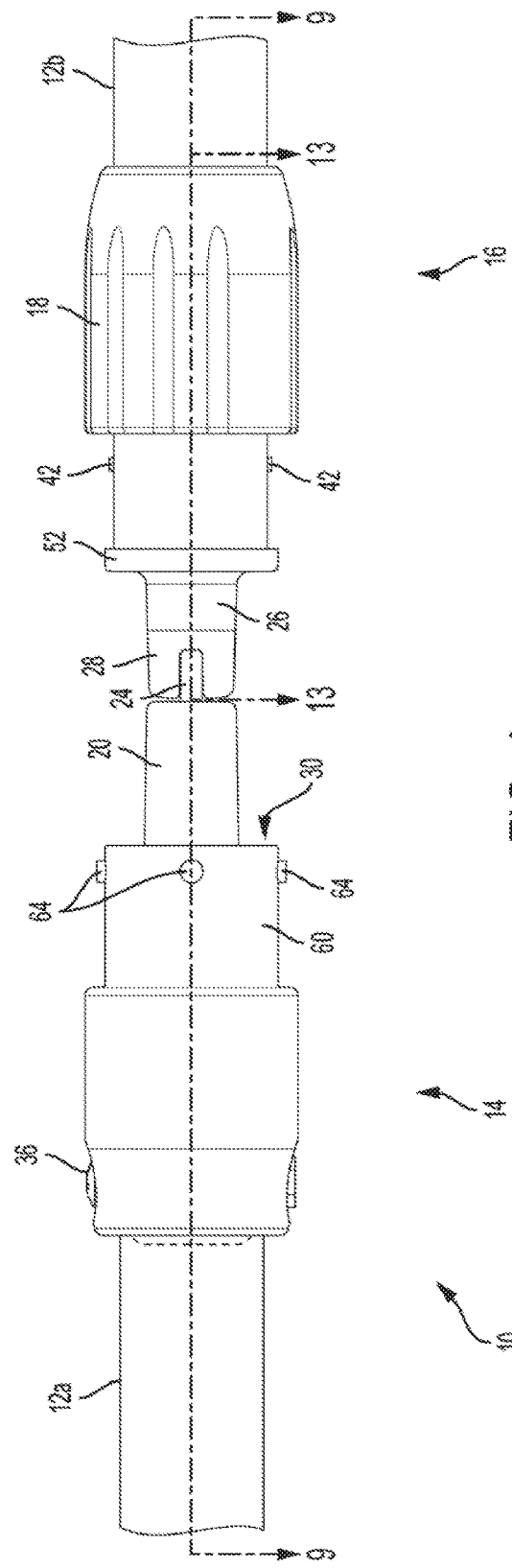
FIG. 4 is a plan view of the hinge in FIG. 3 in an unlocked position and with the sliding member withdrawn.

The bar 24 can be at least partially received within a first recess 32 in the sliding member 20 and a second recess 34 in the post portion 26 when the base body 14 and sleeve body 16 are aligned as seen in FIGS. 4-5. The recessing of the bar 24 helps streamline the shape and size of the hinge 10. Recessing of the bar 24 also helps prevent the hinge 10 from racking and from being over rotated when not locked.

Figure 8:
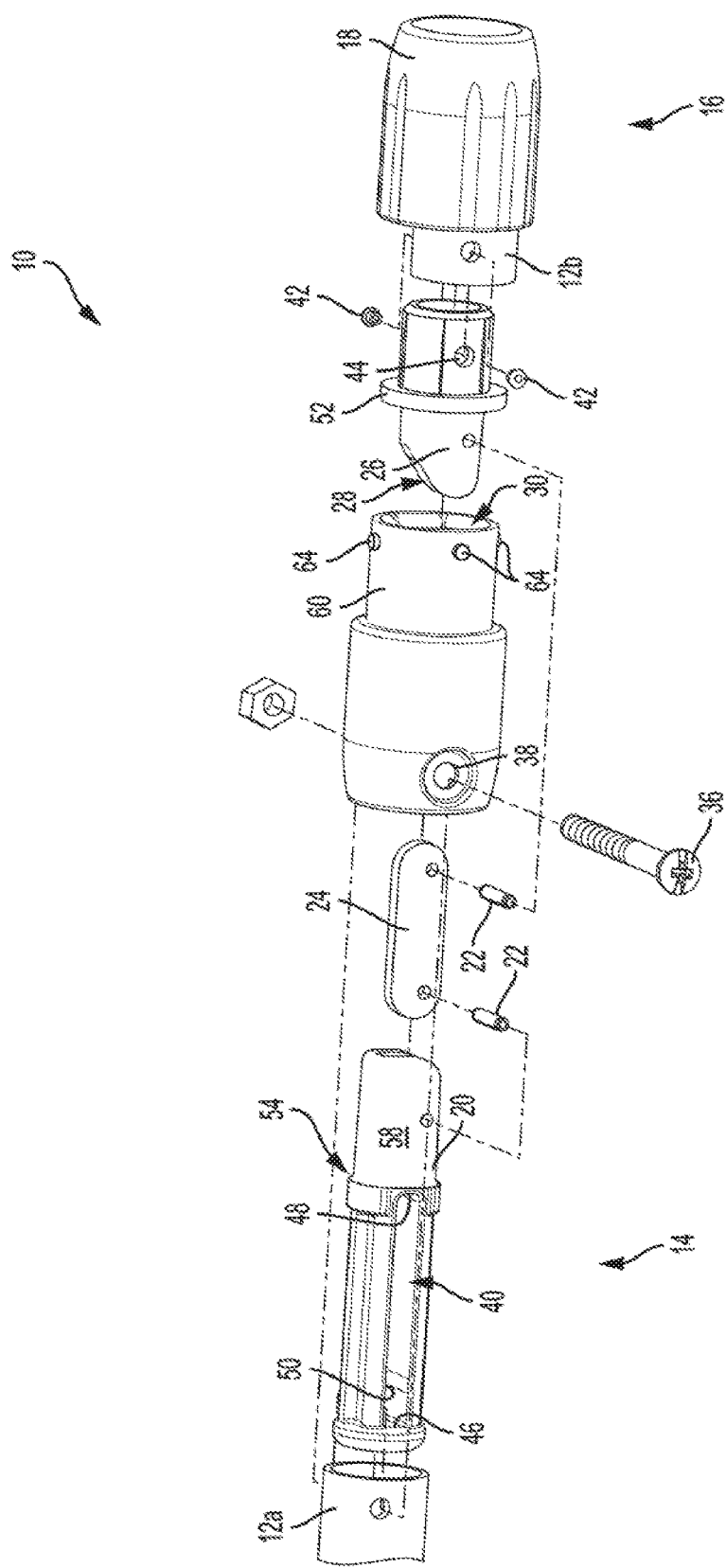
FIG. 8 is an exploded perspective view of the hinge of FIG. 5.

As seen in the embodiment shown in FIG. 8, the sliding member has a slot 40. The slot 40 can engage a post of the base body 14 to slidably attach the sliding member 20 to the base body 14. In the embodiment shown in FIG. 8, the post is the fastener 36 which attaches the base body 14 to the structure 12*b*. The fastener 36 goes through a hole 38 in one side of the base body 14, a hole in the structure 12*a*, the slot 40 in the sliding member 20, through another hole in the structure (not shown), the hole in a second side of the base body (not shown) and then into a bolt to secure and attach the base body 14 to the structure 12*a* and slidably attach the sliding member 20 therewith. This structure also helps prevent the hinge 10 from racking when not locked.

A second fastener 42, for example a bolt or one or more rivets, can be used to secure or attach the structure 12*b* to the sleeve body 16. For example, a rivet 42 can be inserted through a hole in a first side of the structure 12*b* and into the hole 44 of the first side of the sleeve body 16 and a second rivet 42 can be inserted through a hole in a second side of the structure 12*b* (not shown) and into the hole of the second side of the sleeve body 16 (not shown) to secure the sleeve body 16 and structure 12*b* together. Although above are described a few examples of fasteners, other means are known in the art for attaching a hinge to a structure, for example welding, gluing, friction fitting, etc., the use of which would not defeat the spirit of the invention.

The length of the slot 40, together with the location of the hole 38, can determine the amount the sliding member 20 can be withdrawn from and inserted into the base body 14. When the fastener 36 reaches a first end 46 of the slot 40, the sliding member 20 will be prevented from being further withdrawn out of the base body 14 as seen in FIG. 8. When the fastener 36 reaches a second end 48 of the slot 40, the sliding member 20 will be prevented from being further inserted into the base body 14 as seen in FIG. 9.

Figure 9:
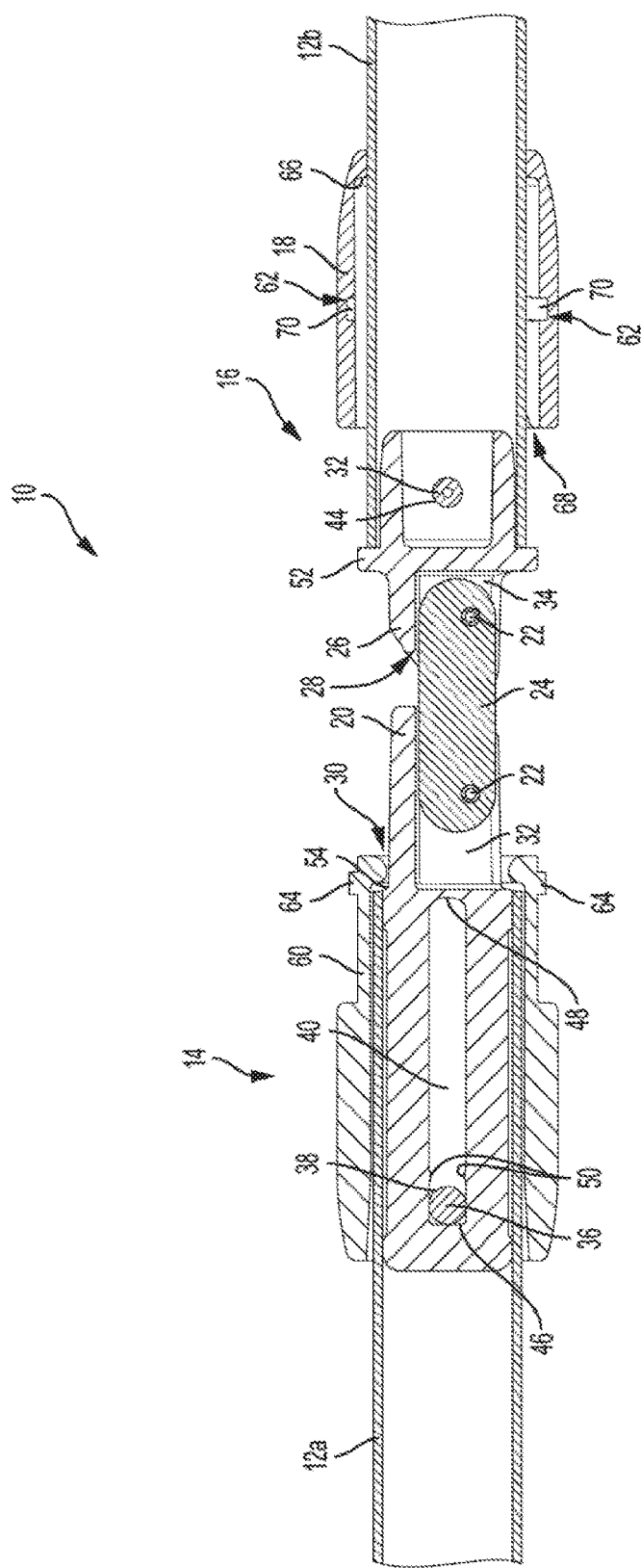
FIG. 9 is a cross-sectional plan view of the hinge of FIG. 4 taken along the lines 9-9.
Figure 10:
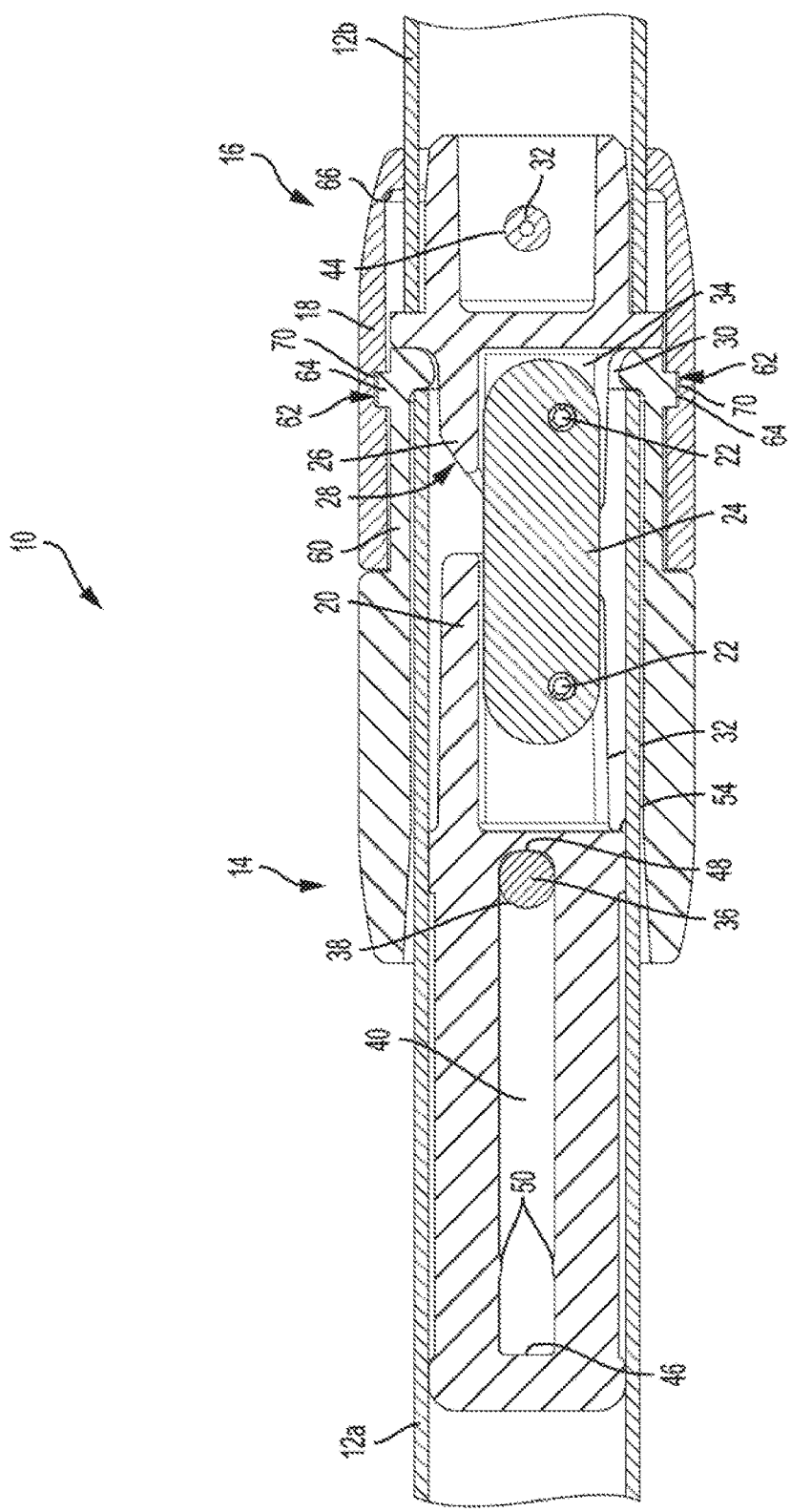
FIG. 10 is a cross-sectional plan view of the hinge of FIG. 3 taken along the lines 10-10.

The slot 40 can also have a detent, catch or other narrowing portion 50 as seen in FIGS. 8-10. As the sliding member 20 is withdrawn into the base body 14, the fastener 36 will ride over or between the detent(s) 50. As the fastener passes the detent(s) 50, a click will be heard and/or felt to inform the user that the sliding member is sufficiently withdrawn out the base body 14. The detent(s) 50 also holds the fastener 36 within a portion of the slot 40 and a portion of the sliding member 20 out of the base body 14 and helps prevent the sliding member from undesirably being slid into the base body as seen in FIG. 9.

Alternatively, or in addition, the sleeve body 16 can have a shoulder 52 that is too large to fit through the opening 30 in the base body 14. When the shoulder 52 contacts the portion of the base body 14 forming the opening 30, the sliding member 20 will be prevented from being further inserted into the base body as seen in FIG. 10. The shoulder 52 can also help set the depth of how far the sleeve body 16 should be inserted into the structure 12*b* if the sleeve portion is configured to be inserted into a hollow structure.

The sliding member 20 may include an annular ridge 54 that is too large to fit through the portion of the base body 14 forming the opening 30 in the base body. When the annular ridge 54 contacts the portion of the base body 14 forming the opening 30, the sliding member 20 will be prevented from being further withdrawn out of the base body as seen in FIG. 9. The annular ridge 54 can also help prevent the sliding member 20 from being disengaged from the base body 14 during installation, e.g. before the base body is attached to a structure 12*b* and the fastener 36 inserted through the slot 40.

Figure 11:
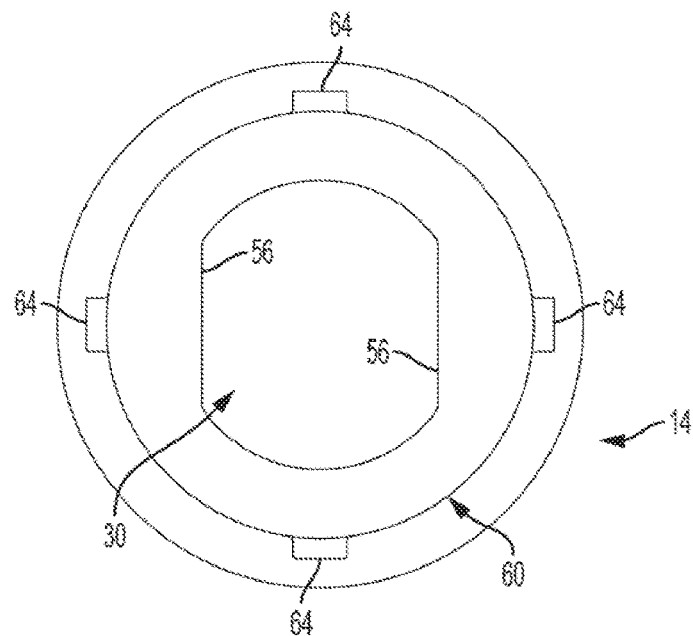
FIG. 11 is a front elevation view of the base body of the hinge in FIG. 3.
Figure 12:
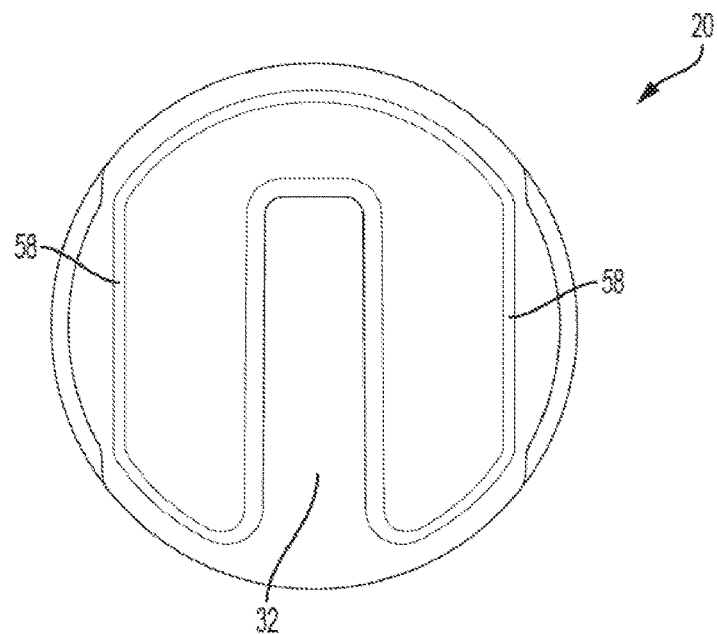
FIG. 12 is a front elevation view of the sliding member of the hinge in FIG. 3.

In the embodiment seen in FIG. 11, the opening 30 of the base body has opposing straight sides 56. As seen in the embodiment shown in FIG. 12, the sliding member 20 has flat portions 58 that are configured to cooperate with the straight sides 56 of the opening 30 such that the sliding member is slidably received by and may slide within the opening. The distance between the flat portions 58 of the sliding member 20, e.g. its width, gradually increases from the recess 32 or front end to the end 48 of the slot 40. The flat portions 58 are sized such that as the sliding member is sufficiently extended out of the slot, e.g. when the fastener 36 nears the first end 46 of the slot 40, the flat portions will come into contact with the straight sides 56 of the opening and selectively wedge therein. This wedging action helps hold the sliding member 20 in its extended position as seen in FIGS. 9 and 4-5. The wedging action also helps prevent the hinge 10 from racking when not locked.

When the sliding member 20 is withdrawn into the base body 14, the collar 18 can be slid onto and selectively engage or receive the neck portion 60 of the base body 14. In the embodiment shown in FIG. 10, the collar has a plurality of grooves 62. In the embodiment shown in FIGS. 4-5, the neck portion 60 has a plurality of tabs 64 that correspond to the plurality of grooves 62. However, more or less than four tabs 64 and/grooves 62 could be used as desired. The grooves 62 and tabs 64 are sized such that the tabs 64 can be received in the grooves 62 to lock the hinge 10. The tabs 64 can also extend outward from the neck portion 60 sufficient to prevent the collar 18 from being slid over the tabs unless the grooves 62 are lined up with the tabs 64.

The collar 18 shown in FIG. 10 has an opening through which the structure 12b extends to slidably attach the collar to the structure and allow the collar to move along the structure. The opening of the collar 18 has an interior surface and can also have an interior rim 66 or other narrowing to contact a stud 42 of the sleeve body 16. In one embodiment, the stud 42 is the portion of the fastener(s) on the outside of the structure 12b, e.g. the head of the rivet(s). As the collar 18 is being slid in a first bearing, e.g. towards or onto the neck portion 60, the interior rim 66 will contact the fastener 42 and, thereby, pull the second structure 12b towards the first structure 12a. This limits the amount the collar 18 can move in the first bearing on the structure 12a and may cause the sliding member 20 to be pushed into the base body 14. When the collar 18 is engaged with the neck portion 60, as will be described further below, the contact between the interior rim 66 with the fastener 42 will act to secure the second structure 12b to the first structure 12a and hold the base body 14 in position with respect to the sleeve body 16.

Figure 13:
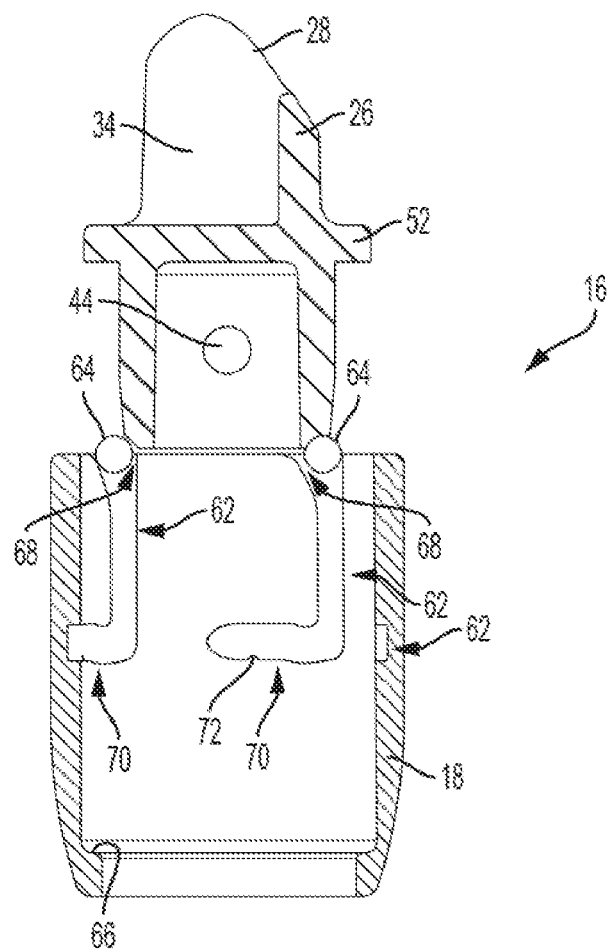
FIG. 13 is a cross-sectional elevation view of the collar of FIG. 4 taken along the line 13-13 with tabs for reference.
Figure 14:
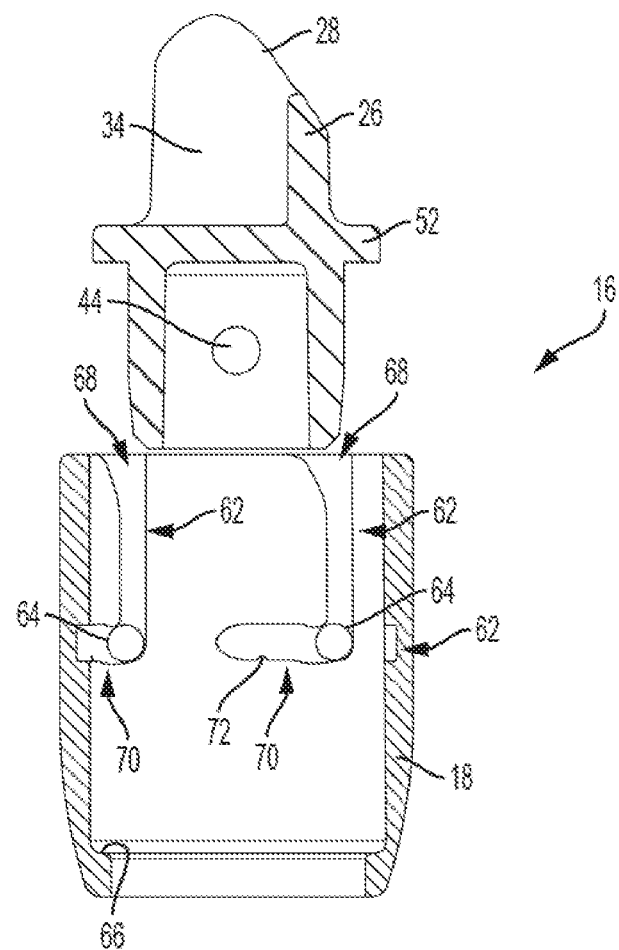
FIG. 14 is a cross-sectional elevation view of the hinge of FIG. 13 with the collar partially rotated.
Figure 15:
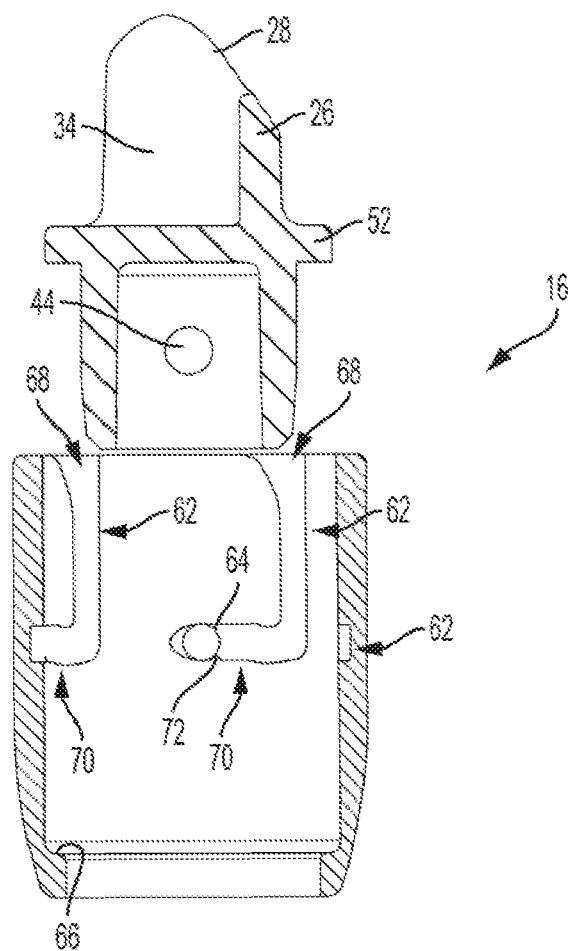
FIG. 15 is a cross-sectional elevation view of the hinge of FIG. 13 with the collar rotated.

In the embodiment shown in FIGS. 13-15, the interior surface of the collar 18 has a plurality of grooves 62. The grooves 62 have a general 'L' shape. The opening 68 of the grooves 62 is flared to allow easier lining up of the tabs 64 and grooves. For example, the collar 18 can abut the tabs 64 and then be rotated until the tabs 64 enter the flared opening 68 of the grooves 62 as seen in FIG. 13. When the tabs 64 are in the grooves 62, the collar 18 can be further slid in the first bearing along the structure 12b onto the neck portion 60 and the tabs 64 slid further down the grooves 62 until they reach the bottom of the grooves as seen in FIG. 14.

Once the tabs 64 are at the bottom of the grooves 62, the collar 18 can be turned or rotated in a second direction, for example clockwise, so that the tabs 64 enter the leg portion 70 of the grooves 62. The beginning of the leg portion 70 angles back towards the opening 68 of the grooves 62. This, in combination with the interior rim 66 contacting the fastener 42, provides a clamping force to positively secure the sleeve body 16 to the base body 14. Towards the end of the leg portion 70 there is a decreased width portion or bumps 72.

As the collar 18 is turned, the tabs 64 ride over or between the bump(s) 72. As the tabs 64 pass the bump(s) 72, a click will be heard and/or felt to inform the user that the sleeve body 16 is engaged and locked with the base body 14. The bump(s) selectively holds the tabs 64 at the ends of the leg portions 70 of the grooves 62. In this position, the hinge 10 is in a locked or engaged position. In the locked position, as seen in FIGS. 1, 3 and 15, the sliding member 20 cannot be slid out of the base body 14 and the base body cannot be rotated with respect to the sleeve body 16 and the structure, accessory or frame 12 cannot be collapsed.

The number, orientation and size of the grooves 62 can determine how much rotation of the collar 18 is needed to lock the hinge 10. In the embodiment shown in FIGS. 13-15, the collar needs to be turned about sixty degrees clockwise to engage the neck portion 60 and lock the hinge 10 and about sixty degrees counterclockwise from the locked position to disengage the neck portion and unlock the hinge. However, more or less rotation could be accomplished by adjusting the number, orientation and/or size of the grooves 62. For example, by shortening the length of the leg portions 70 of the grooves 62, the collar could be locked/unlocked by a turn of less than sixty degrees, e.g. thirty degrees.

The main components of the hinge 10, for example, the base body 14, sleeve body 16, collar 18, sliding member 20, etc., could be manufactured through many methods known in the industry, including injection molding, casting or 3D printing, from a variety of materials including metals and plastics. In the embodiment shown in FIG. 5, the base body 14, sleeve body 16, collar 18 and sliding member 20 are made from plastic for ease of manufacture and assembly and cost.

Applications for the hinge 10 of the present invention are numerous and wide-varied. For example, the hinge could be used in a number of collapsible accessories such as tents, camera tripods, baseball pitching screens, display easels, or shade structures such as canopies. The hinge 10 could be used with a structure that also employs other hardware. In the marine industry, the hinge could be used on frame members for shades, such as bimini tops, or other enclosures. In a bimini top, one or more hinges, for example 10a-b, could be used on a 'U' shaped frame between several structural members 12a-c, as seen in FIGS. 1-2, or a locking strut to support a top frame. These are just a few examples of the variety of uses of such a hinge.

Although the invention has been herein described in what is perceived to be the most practical and preferred embodiments, it is to be understood that the invention is not intended to be limited to the specific embodiments set forth above. For example, although the support member is described as being used in a frame for a marine top, the support member could be used in a variety of applications including different collapsible structures. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A hinge comprising:
   a first body having a post, the first body configured to be attached to a first structure and having a neck portion;
   a second body configured to be attached to a second structure;
   a sliding member having a slot formed therein, the sliding member slidably attached to the first body and pivotally connected to the second body; and
   a collar connected to the second body and configured to selectively engage the neck portion such that when the collar is engaged with the neck portion the hinge is in a locked position and the second body cannot be rotated with respect to the first body; and
   wherein the collar has an interior rim and when the collar is engaged with the neck portion, the interior rim contacts a stud of the second body to hold the second body in position with respect to the first body; and
   wherein the slot has a detent to selectively hold the post within a portion of the slot.

2. The hinge of claim 1 wherein the post is a fastener for securing the first body to the first structure.

3. The hinge of claim 1 wherein when the collar is rotated in a first direction, the collar disengages the neck portion such the hinge is in the unlocked position and when the collar is rotated a second direction, the collar engages the neck portion such that the hinge is in a locked position.

4. The hinge of claim 3 wherein the collar is rotated between about 30 and 60 degrees to move the hinge between the locked position and unlocked position.

5. The hinge of claim 3 wherein the collar has an opening formed therein sufficient to allow the second structure to extend through the opening to slidably attach the collar to the second structure.

6. The hinge of claim 1 wherein the stud is a fastener for securing the second body to the second structure.

7. A hinge comprising:
- a first body configured to be attached to a first structure and having a neck portion;
- a second body configured to be attached to a second structure;
- a sliding member slidably attached to the first body and pivotally connected to the second body; and
- a collar connected to the second body and configured to selectively engage the neck portion such that when the collar is engaged with the neck portion the hinge is in a locked position and the second body cannot be rotated with respect to the first body; and
- wherein the collar has an interior rim and when the collar is engaged with the neck portion, the interior rim contacts a stud of the second body to hold the second body in position with respect to the first body; and
- wherein the sliding member is rotatably attached to a bar at one end of the bar and the bar is rotatably attached to the second body at a second end of the bar.

8. The hinge of claim 7 wherein the sliding member has a first recess formed therein and the second body has a second recess formed therein and the bar is partially located in the first recess and second recess.

9. The hinge of claim 7 wherein the bar is rotatably connected to a post portion of the second body and the post portion includes an angled surface such that when the second body is rotated with respect to the first body, the second body does not contact the neck portion.

10. A hinge for pivotally connecting a first structure to a second structure, the hinge comprising:
- a sleeve body configured to be attached to the first structure;
- a base body having at least one tab and configured to be attached to the second structure;
- a post slidably received by the base body and rotatably attached to the sleeve body;
- a boom rotatably attached to the post at a first end of the boom and rotatably attached to the sleeve body at a second end of the boom; and
- a sleeve configured to selectively engage the at least one tab such that when the sleeve is engaged with the at least one tab the post cannot be slid and when the sleeve is not engaged with the at least one tab, the post can be slid such that a portion of the post extends out of the base body.

11. The hinge of claim 10 wherein when the sleeve is not engaged with the at least one tab and the portion of the post extends out of the base body, the sleeve can be rotated with respect to the base body.

12. The hinge of claim 11, wherein the sleeve can be rotated to be generally parallel to the base body.

13. The hinge of claim 12 wherein the sleeve has at least one groove that is configured to receive the at least one tab.

14. The hinge of claim 13 wherein the at least one groove includes a bump to selectively hold the at least one tab within a portion of the at least one groove.

15. The hinge of claim 10 wherein the post is slidably received in an opening formed in the base body, the opening having at least one straight side and wherein the post has at least one flat portion configured to cooperate with the straight side of the opening to slide into and out of the base body.

16. The hinge of claim 15 wherein the opening has opposing straight sides;
- wherein the post has opposing flat portions that cooperate with the opposing straight sides; and
- wherein a distance between the flat portions increases from a front end of the post such that when the portion of the post is sufficiently extended out of the base body, the flat portions will contact the flat sides to selectively wedge the post in the opening.

17. A collapsible accessory comprising:
- a frame having at least a first structure and a second structure; and
- a hinge located between and attached to the first structure and second structure, the hinge further comprising:
  - a first body having a neck portion;
  - a post having a slot;
  - a first fastener extending through the first body, first structure and slot to attach the first body to the first structure and slidably attach the post to the first body;
  - a second body having a post portion and attached to the second structure by a second fastener,
  - a collar with an opening forming an interior surface and an interior rim,
  - a boom rotatably connected at a first end to the post and at a second end to the second body;
  - wherein the second structure extends through the opening to attach the collar to the second structure to allow the collar to move along the second structure,
  - wherein the movement of the collar is limited in a first bearing when the interior rim contacts the second fastener;
  - wherein the interior surface has a plurality of grooves;
  - wherein each groove of the plurality of grooves is generally L-shaped;
  - wherein the neck portion has a plurality of tabs that correspond to the plurality of grooves;
  - wherein the collar be slid in the first bearing such that the plurality of tabs are received in the plurality of grooves;
  - wherein when the plurality of tabs are received in the plurality of grooves, the collar can be rotated to engage the hinge and prevent the collapsible accessory from collapsing;
  - wherein when the plurality of tabs are not received in the plurality of grooves, the post can slide at least partially out of the first body and the collapsible accessory can collapse.

* * * * *